United States Patent
Garg et al.

(10) Patent No.: US 8,977,882 B2
(45) Date of Patent: Mar. 10, 2015

(54) SYSTEM FOR DATA TRANSFER BETWEEN ASYNCHRONOUS CLOCK DOMAINS

(71) Applicants: Sandeep Garg, Greater Noida (IN); Asif Iqbal, Cambridge, MA (US); Rajan Kapoor, Faridabad (IN)

(72) Inventors: Sandeep Garg, Greater Noida (IN); Asif Iqbal, Cambridge, MA (US); Rajan Kapoor, Faridabad (IN)

(73) Assignee: Free Scale Semiconductor, Inc., Austin, TX (US)

( * ) Notice: Subject to any disclaimer, the term of this patent is extended or adjusted under 35 U.S.C. 154(b) by 374 days.

(21) Appl. No.: 13/682,755

(22) Filed: Nov. 21, 2012

(65) Prior Publication Data

US 2014/0143581 A1 May 22, 2014

(51) Int. Cl.
*G06F 1/12* (2006.01)
*G06F 5/06* (2006.01)

(52) U.S. Cl.
CPC ..... *G06F 1/12* (2013.01); *G06F 5/06* (2013.01)
USPC ......................................................... 713/400

(58) Field of Classification Search
CPC ........... G06F 1/12; G06F 13/00; G06F 13/14; G06F 13/1689; G06F 5/06; G06F 5/65; G06F 5/16; G11C 7/106; G11C 7/1063; G11C 7/1066; H04L 7/00; H04L 7/0012; H04L 7/0033; H04L 7/005
See application file for complete search history.

(56) References Cited

U.S. PATENT DOCUMENTS

| 6,377,650 B1 | 4/2002 | Deng |
| 6,499,080 B1 | 12/2002 | Deng |
| 2004/0243869 A1 | 12/2004 | Sharma |
| 2005/0116783 A1 * | 6/2005 | Adkisson ........................ 331/25 |
| 2007/0280396 A1 * | 12/2007 | Liu et al. ........................ 375/372 |
| 2009/0261869 A1 * | 10/2009 | Gillespie et al. .............. 327/141 |

OTHER PUBLICATIONS

Sathe, V., Papaefthymiou, M. C., Kosonocky, S. V., and Kim, S., On-chip Synchronous Communication Between Clock Domains with Quotient Frequencies, Electronics Letters, vol. 43, No. 9, pp. 497-498, Apr. 26, 2007.
Simon Moore, George Taylor, Bob Mullins and Peter Robinson, Channel Communication Between Independent Clock Domains, First ACiD-WG Workshop of the European Commission's Fifth Framework Programme, 2001.

* cited by examiner

*Primary Examiner* — Dennis M Butler
(74) *Attorney, Agent, or Firm* — Charles Bergere

(57) ABSTRACT

A system for transferring data between asynchronous domains in an SOC includes a slave request generation and data latch circuit, a busy signal generator, a positive edge detector, and a cascaded synchronizer. A host device transmits a host request signal and host data to the slave request generation and data latch circuit for execution by a slave device, which operates at a different frequency than the host device. The slave request generation and data latch circuit stores the host data and transmits it to the slave device based on a synchronized slave clock signal. The host device can perform other tasks while the slave device executes the host request.

20 Claims, 4 Drawing Sheets

SYSTEM FOR DATA TRANSFER BETWEEN ASYNCHRONOUS CLOCK DOMAINS

BACKGROUND OF THE INVENTION

The present invention relates generally to electronic circuits, and, more specifically, to a system for data transfer between asynchronous clock domains of an electronic circuit.

System-on-chips (SoCs) often include multiple clock domains that operate at different clock frequencies that are asynchronous with respect to each other. Special design and interface techniques are used to transfer data between such asynchronous clock domains. An example of one such interfacing technique is a handshake protocol. In the handshake protocol, a first clock domain, e.g., a transmitter transmits a request signal to a second clock domain, e.g., a receiver, and requests the receiver to accept data available on a data bus that connects the first and second clock domains. Thereafter, the receiver asserts an acknowledge signal, signaling that it has accepted the data.

Though the handshake protocol is simple in execution, it is fraught with shortcomings. Due to the asynchronous nature of the transmitter and receiver clock domains, the handshaking protocol is prone to setup and hold time violations, thereby leading to meta-stability and unreliable data transfer. Two stage or higher stage cascaded synchronizers may be used between the transmitter and receiver clock domains to transfer the control signals to eliminate data transfer errors. However, the handshaking protocol is rendered inefficient when the synchronizers are used for data transfer between domains that operate at substantially different clock signal frequencies. For example, a host device (i.e., a central processing unit, CPU) of a register programming interface block operating at a clock signal frequency that is different from that of a slave device (i.e., a register) of the register programming interface block and performing back-to-back write operations to the same register must wait for at least two slave and two host clock cycles. If the ratio of the frequencies of the host and slave clock signals is greater than two, the overall performance of the system is degraded. Clock cycles are wasted in synchronizing the request and acknowledgement signals and the register programming interface block is stalled during a write transaction to a slower clock domain until the handshake is completed. The data bus also is stalled while waiting on a slower clock domain for back-to back register access transactions between different peripheral controllers using the data bus, which leads to unnecessary consumption of CPU clock cycles. CPU clock cycles are important in calculation-intensive SoC applications and any waste leads to a slow response, which degrades the overall performance of the SoC.

Therefore, it would be advantageous to have a system for transferring data between asynchronous clock domains that is fast and efficient, uses the CPU clock cycles effectively, and overcomes the above-mentioned limitations of conventional data transfer systems.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1:
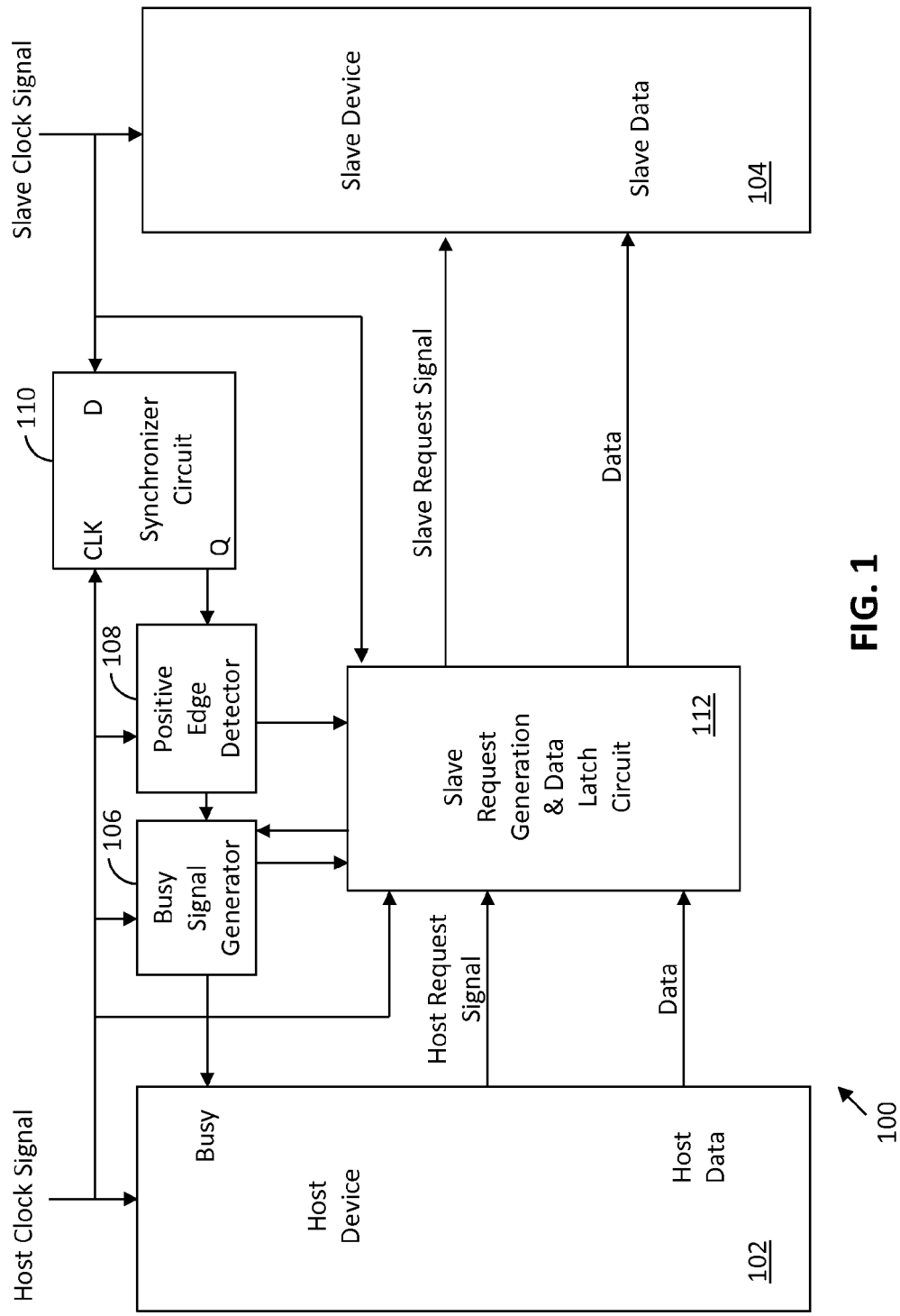
FIG. 1 is a schematic block diagram depicting a system for transferring data from a host device to a slave device in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention. As used herein, the term multiplexer has been abbreviated as mux.

In an embodiment of the present invention, a system for transferring data from a host device to a slave device is provided. The host and slave devices operate on host and slave clock signals, respectively. The system includes a synchronizer circuit for synchronizing the slave clock signal with the host clock signal and generating a synchronized slave clock signal. A positive edge detector is connected to the synchronizer circuit for detecting and generating a positive edge of the synchronized slave clock signal. A busy signal generator is connected to the positive edge detector and the host device for generating a busy signal when a host request is being processed by the slave device. A slave request generation and data latch circuit is connected to the host device, the slave device, the positive edge detector, and the busy signal generator, for receiving and storing one or more host requests and host data, and generating and transmitting a slave request signal to the slave device. The slave request generation and data latch circuit generates and transmits the slave request signal when the busy signal is de-asserted and the positive edge of the synchronized slave clock signal is generated.

In another embodiment of the present invention, a system for transferring data from a host device to a slave device is provided. The host and slave devices operate on host and slave clock signals, respectively. The system includes a synchronizer circuit for synchronizing the slave clock signal with the host clock signal and generating a synchronized slave clock signal. A positive edge detector is connected to the synchronizer circuit for detecting and generating a positive edge of the synchronized slave clock signal. A busy signal generator is connected to the positive edge detector and the host device, for generating a busy signal when a host request is being processed by the slave device. The busy signal generator includes first and second NOT gates for receiving slave and pending request signals and generating inverted slave and pending request signals, respectively. A first AND gate is connected to the first and second NOT gates, for receiving the inverted slave and inverted pending request signals, the busy signal, and a host request signal and generating a first intermediate signal. A second AND gate is provided for receiving the host and slave request signals, and the positive edge of synchronized slave clock signal and generating a second intermediate signal. A NOR gate is connected to the output terminals of the first and second AND gates, for receiving the first and second intermediate signals and generating a third intermediate signal. A first flip-flop has a data input terminal connected to the NOR gate for receiving the third intermediate signal, a clock input terminal that receives the host clock signal, and an output terminal that generates the busy signal. The output of the first flip-flop is connected to an input of the first AND gate.

The system further includes a slave request generation and data latch circuit that is connected to the host and slave devices, the positive edge detector, and the busy signal generator, for receiving and storing one or more host requests and host data, and generating and transmitting a slave request signal to the slave device when the busy signal is de-asserted and the positive edge of the synchronized slave clock signal is generated. The slave request generation and data latch circuit includes a pending request signal generator for generating the pending request signal. The pending request signal generator includes third and fourth NOT gates, third through fifth AND gates, first through third multiplexers and a second flip-flop. The third NOT gate receives the busy signal and generates an inverted busy signal. The third AND gate is connected to the third NOT gate for receiving the inverted busy and host request signals and generating a fourth intermediate signal. The fourth AND gate receives the pending request signal and the positive edge of the synchronized slave clock signal and generates a fifth intermediate signal. The fourth NOT gate receives the busy signal and generates the inverted busy signal and the fifth AND gate receives the positive edge of synchronized slave clock signal and the inverted busy signal, and generates a sixth intermediate signal. The first multiplexer has a first input that receives logic one as a first input signal, a second input that receives the pending request signal, and a select input connected to the output of the third AND gate for receiving the fourth intermediate signal. The first multiplexer selectively provides one of the pending request and first input signals as a first mux output signal. The second multiplexer has a first input that receives logic zero as a second input signal, a second input that is connected to the output terminal of the first multiplexer for receiving the first mux output signal, and a select input connected to the output terminal of the fourth AND gate for receiving the fifth intermediate signal. The second multiplexer selectively provides one of the second input and first mux output signals as a second mux output signal. The third multiplexer has a first input that receives logic zero as a third input signal, a second input that is connected to the output terminal of the second multiplexer for receiving the second mux output signal, and a select input connected to the output terminal of the fifth AND gate for receiving the sixth intermediate signal. The third multiplexer selectively provides one of the third input and second mux output signals as a third mux output signal. The second flip-flop has a data input terminal connected to the output terminal of the third multiplexer for receiving the third mux output signal, a clock input terminal that receives the host clock signal, and an output terminal that provides the pending request signal. The output terminal of the second flip-flop is connected to the second input terminal of the first multiplexer.

Various embodiments of the present invention provide a system for transferring data between host and slave devices of a system-on-chip (SoC) that operate at substantially different clock signal frequencies. The system includes a slave request generation and data latch circuit. The host device transmits a host request signal and host data to the slave request generation and data latch circuit for execution by the slave device. The slave request generation and data latch circuit stores the host data and transmits the host data to the slave device at a positive edge of a synchronized slave clock signal. The host device can perform other tasks when the slave device is executing the host request, thereby reducing the number of clock cycles of the host clock signal required by the host device, which increases the efficiency of the host device. Synchronizing the slave clock signal with the host clock signal eliminates the need for a handshake mechanism between the host and slave devices and reduces latency in data processing.

Referring now to FIG. 1, a schematic block diagram depicting a system 100 for transferring data from a host device 102 to a slave device 104, in accordance with an embodiment of the present invention, is shown. In addition to the host and slave devices 102 and 104, the system 100 includes a busy signal generator 106, a positive edge detector 108, a synchronizer circuit 110, and a slave request generation and data latch circuit 112.

The host device 102 generates a host request signal for transmitting host data to the slave device 104. In an embodiment of the present invention, the host device 102 is a processor and the slave device 104 is a data register (not shown) and both of the host and slave devices 102 and 104 are a part of a system-on-chip (SoC, not shown). The host data includes programming instructions issued by the processor for programming the data register. The host device 102 operates on a host clock signal and the slave device 104 operates on a slave clock signal. In an embodiment of the present invention, the host clock signal has a higher frequency than the slave clock signal. The synchronizer circuit 110 synchronizes the frequency of the slave clock signal in a host clock domain (i.e., the host device 102) to generate a synchronized slave clock signal. The synchronizer circuit 110 receives the slave clock signal at an input terminal (D) and the host clock signal at a clock input terminal (CLK) and generates the host clock domain synchronized slave clock signal at an output terminal (Q). The synchronizer circuit 110 is well known in that art and may be formed using a pair of cascaded flip-flops (not shown). The synchronized slave clock signal is provided to the positive edge detector 108 that detects a positive edge of the synchronized slave clock signal which is provided to the busy signal generator 106. The busy signal generator 106 also receives the host clock signal, a slave request signal, a pending request signal, and the host request signal and generates a busy signal. The busy signal is transmitted to the host device 102 and the slave request generation and data latch circuit 112.

When the host device 102 signals a valid transaction request, it asserts the host request signal along with data on a data bus. When the busy signal is de-asserted, the host request is accepted and the data is stored by the slave request generation and data latch circuit 112. The slave request generation and data latch circuit 112 may include a host data latch formed using one or more flip-flops (not shown) that store host data corresponding to one or more host requests that are transmitted to the slave device 104 for processing, based on the host request and busy signals. The slave request generation and data latch circuit 112 also includes a pending request signal generator (shown in FIG. 3) that receives the host request signal, the host clock signal, and the positive edge of the synchronized slave clock signal and generates the pending request signal, which indicates that a host request is pending at the host device 102. The slave request generation and data latch circuit 112 further includes a slave request generator (shown in FIG. 4) that receives the positive edge of the synchronized slave clock signal, and the busy, host request, pending request, and host clock signals and generates the slave request signal. Upon storing the host data, the host device 102 is not required to wait for the host request to be executed by the slave device 104 and can continue executing other priority tasks, thereby reducing the number of clock cycles required by the host device 102. Further upon storing the host data, the pending request signal is driven to a logic high state based on the host request signal, the host clock signal, and the detection of the positive edge of the synchronized slave clock signal. The logic high state of the pending request signal indicates that a pending host request is queued for execution by the slave device 104 and the host data is pending to be transmitted to the slave device 104. The slave request signal is generated based on the positive edge of the synchronized slave clock signal, and the busy, host request, pending request, and host clock signals. When the slave request signal is driven to a logic high state upon detecting the positive edge of the synchronized slave clock signal, the host data is transmitted to the slave device 104 for processing.

Figure 2:
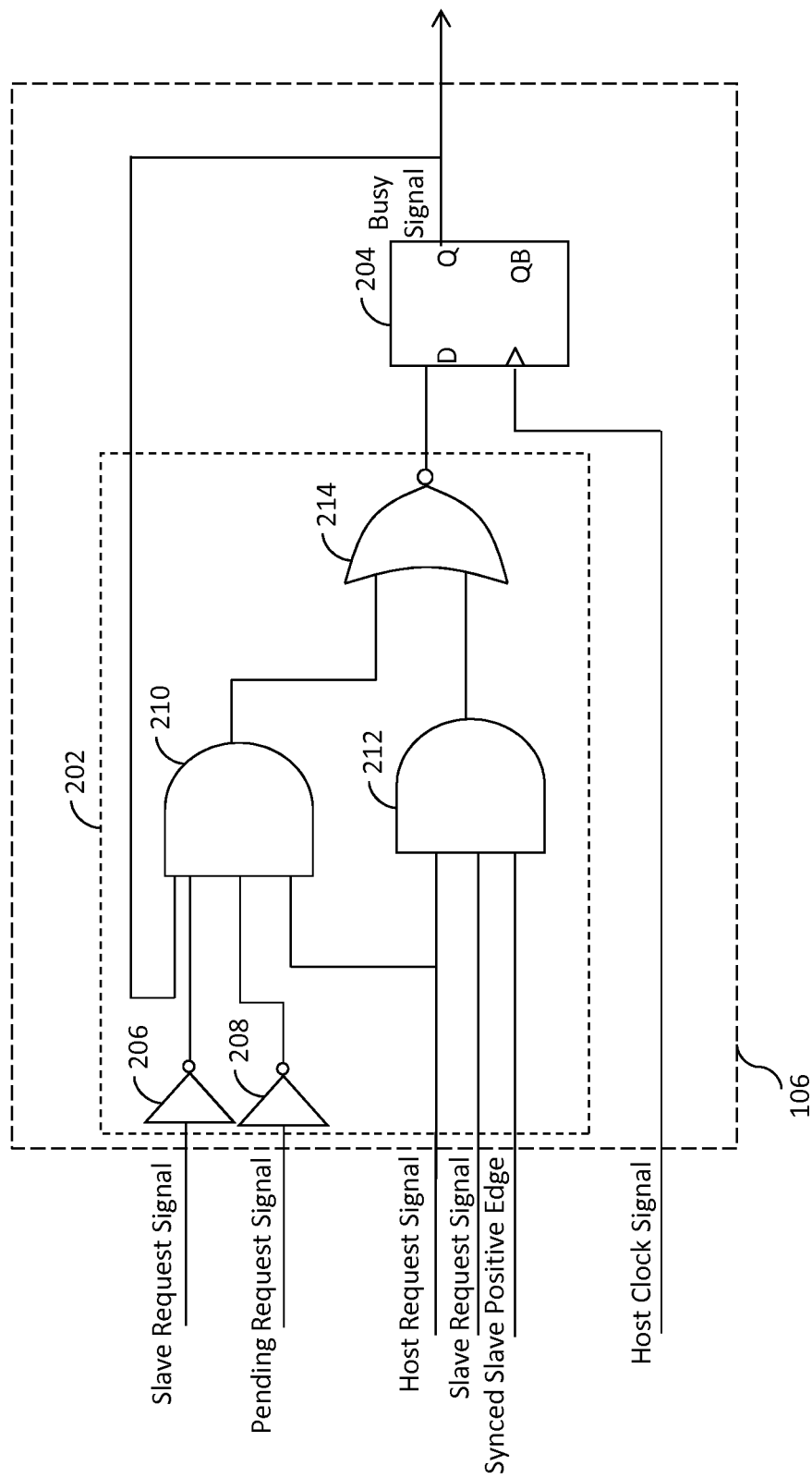
FIG. 2 is a schematic block diagram depicting a busy signal generator in accordance with an embodiment of the present invention.

Referring now to FIG. 2, a schematic block diagram depicting the busy signal generator 106 in accordance with an embodiment of the present invention, is shown. The busy signal generator 106 includes a first logic circuit 202 and a first flip-flop 204. The first logic circuit 202 includes first and second NOT gates 206 and 208, first and second AND gate 210 and 212, and a NOR gate 214.

The first and second NOT gates 206 and 208 are connected to the first AND gate 210. An output terminal of the first AND gate 210 is connected to a first input terminal of the NOR gate 214 and an output terminal of the second AND gate 212 is connected to a second input terminal of the NOR gate 214. An output terminal of the NOR gate 214 is connected to an input terminal (D) of the first flip-flop 204 and an output terminal of the first flip-flop 204 is connected to the first AND gate 210.

The first and second NOT gates 206 and 208 receive the slave request and pending request signals and generate inverted slave request and inverted pending request signals, respectively, which are transmitted to the first AND gate 210. The first AND gate 210 also receives the busy signal from the output terminal of the flip-flop 204 and the host request signal. The first AND gate 210 generates and transmits a first intermediate signal to the NOR gate 214. The second AND gate 212 receives the host and slave request signals and the positive edge of the synchronized slave clock signals. The second AND gate 212 generates and transmits a second intermediate signal to the NOR gate 214. The NOR gate 214 receives the first and second intermediate signals and generates and transmits a third intermediate signal to the input terminal of the first flip-flop 204. The first flip-flop 204 also receives the host clock signal at a clock input terminal and generates the busy signal at the output terminal thereof.

Figure 3:
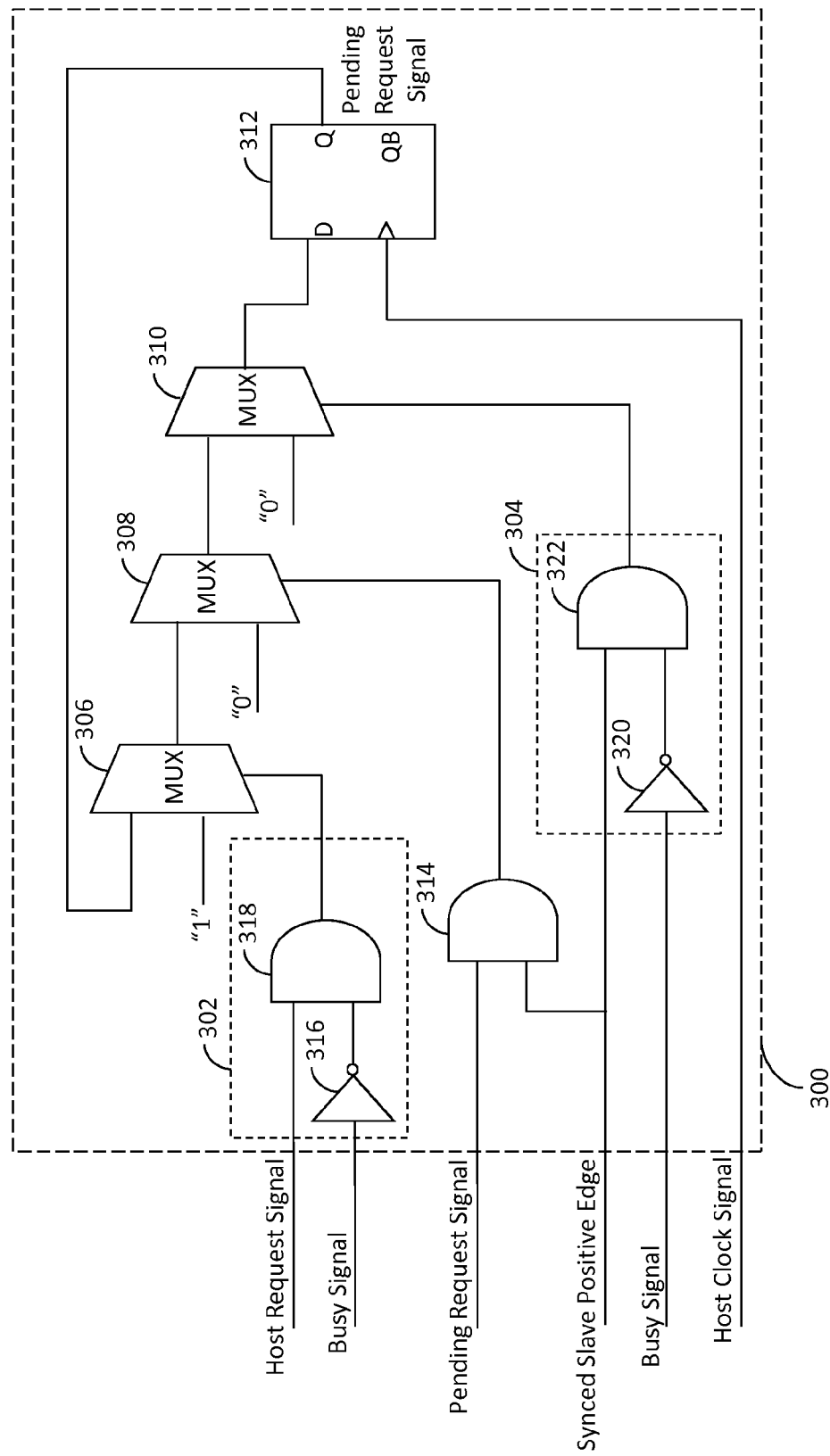
FIG. 3 is a schematic block diagram depicting a pending request signal generator in accordance with an embodiment of the present invention.

Referring now to FIG. 3, a schematic block diagram depicting the pending request signal generator 300, in accordance with an embodiment of the present invention, is shown. The pending request signal generator 300 is part of the slave request generation and data latch circuit 112 and includes a second and third logic circuits 302 and 304, three muxes (first through third muxes) 306-310, a second flip-flop 312, and a third AND gate 314. The second logic circuit 302 includes a third NOT gate 316 and a fourth AND gate 318 and the third logic circuit 304 includes a fourth NOT gate 320 and a fifth AND gate 322.

The third NOT gate 316 is connected to the fourth AND gate 318 and an output terminal of the fourth AND gate 318 is connected to a select input terminal of the first mux 306. An output terminal of the third AND gate 314 is connected to a select input terminal of the second mux 308 and a second input terminal of the second mux 308 is connected to an output terminal of the first mux 306. The fourth NOT gate 320 is connected to the fifth AND gate 322 and an output terminal of the fifth AND gate 322 is connected to a select input terminal of the third mux 310. An output terminal of the second mux 308 is connected to a second input terminal of the third mux 310 and an output terminal of the third mux 310 is connected to an input terminal (D) of the second flip-flop 312. An output terminal of the second flip-flop 312 is connected to a second input terminal of the first mux 306. The second flip-flop 312 receives the host clock signal at a clock input terminal thereof.

The third NOT gate 316 receives the busy signal and generates an inverted busy signal. The fourth AND gate 318 receives the host request signal and the inverted busy signal and generates a fourth intermediate signal. The fourth AND gate 318 transmits the fourth intermediate signal to the select input terminal of the first mux 306. The first mux 306 receives logic one as a first input signal at a first input terminal thereof and the pending request signal at the second input terminal thereof and selectively provides at least one of the first input and pending request signals as a first output signal at the output terminal thereof. The first output signal is provided to the second input terminal of the second mux 308. The second mux 308 receives logic zero as a second input signal at a first input terminal thereof.

The third AND gate 314 receives the pending request signal and the positive edge of the synchronized slave clock signal and generates and transmits a fifth intermediate signal to the select input terminal of the second mux 308. The second mux 308 selectively provides at least one of the second input and first output signals as a second output signal at an output terminal thereof. The second output signal is provided to the second input terminal of the third mux 310. Further, logic zero is provided as a third input signal at a first input terminal of the third mux 310.

The fourth NOT gate 320 receives the busy signal and generates the inverted busy signal and transmits the inverted busy signal to the fifth AND gate 322. The fifth AND gate 322 also receives the positive edge of the synchronized slave clock signal and generates and transmits a sixth intermediate signal to a select input terminal of the third mux 310. The third mux 310 selectively provides at least one of the third input and second output signals at an output terminal thereof as a third output signal.

The third mux 310 transmits the third output signal to the input terminal D of the second flip-flop 312. The second flip-flop 312 generates the pending request signal based on the third output signal and the host clock signal.

Figure 4:
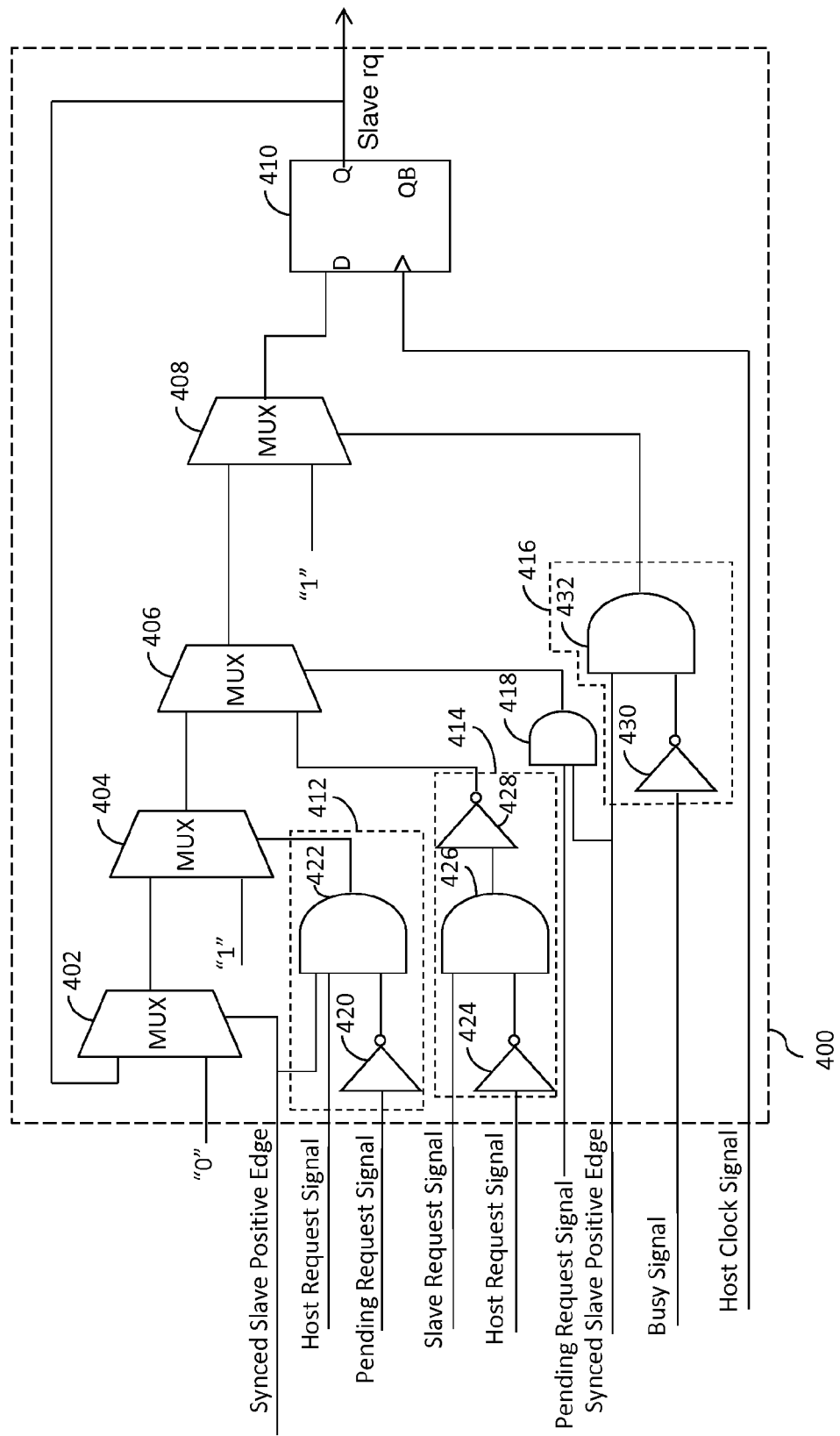
FIG. 4 is a schematic block diagram depicting a slave request signal generator in accordance with an embodiment of the present invention.

Referring now to FIG. 4, a schematic block diagram depicting the slave request signal generator 400, in accordance with an embodiment of the present invention, is shown. The slave request signal generator 400 is also a part of the slave request generation and data latch circuit 112 and includes four muxes (fourth through seventh muxes) 402-408, a third flip-flop 410, three logic circuits (fourth through sixth logic circuits) 412-416, and a sixth AND gate 418. The fourth logic circuit 412 includes a fifth NOT gate 420 and a seventh AND gate 422. The fifth logic circuit 414 includes a sixth NOT gate 424, an eighth AND gate 426, and a seventh NOT gate 428. The sixth logic circuit 416 includes an eighth NOT gate 430 and a ninth AND gate 432.

The fifth NOT gate 420 is connected to the seventh AND gate 422 and an output terminal of the seventh AND gate 422 is connected to a select input terminal of the fifth mux 404. A second input terminal of the fifth mux 404 is connected to an output terminal of the fourth mux 402. The sixth NOT gate 424 is connected to the eighth AND gate 426 and an output terminal of the eighth AND gate 426 is connected to the seventh NOT gate 428. The seventh NOT gate 428 is connected to a first input terminal of the sixth mux 406 and a second input terminal of the sixth mux 406 is connected to an output terminal of the fifth mux 404. An output terminal of the sixth AND gate 418 is connected to a select input terminal of the sixth mux 406. A second input terminal of the seventh mux 408 is connected to an output terminal of the sixth mux 406. The eighth NOT gate 430 is connected to the ninth AND gate 432 and an output terminal of the ninth AND gate 432 is connected to a select input terminal of the seventh mux 408. An output terminal of the seventh mux 408 is connected to an input terminal (D) of the third flip-flop 410 and an output terminal of the third flip-flop 410 is connected to a second input terminal of the fourth mux 402.

The fourth mux 402 receives the positive edge of the synchronized slave clock signal at a select input terminal thereof and logic zero as a fourth input signal at a first input terminal and the slave request signal at the second input terminal thereof. The fourth mux 402 selectively provides at least one of the fourth input and slave request signals at the output terminal thereof as a fourth output signal. The fifth NOT gate 420 receives the pending request signal and generates and transmits an inverted pending request signal to the seventh AND gate 422. The seventh AND gate 422 also receives the positive edge of the synchronized slave clock signal, the host request signal, and the inverted pending request signal and generates a seventh intermediate signal at an output terminal thereof. The seventh AND gate 422 provides the seventh intermediate signal to the select input terminal of the fifth mux 404. The fifth mux 404 receives logic one as a fifth input signal at a first input terminal and the fourth output signal at the second input terminal and selectively provides at least one of the fifth input and fourth output signals as a fifth output signal at the output terminal thereof. The sixth NOT gate 424 receives the host request signal and generates and transmits an inverted host request signal to the eighth AND gate 426. The eighth AND gate 426 also receives the slave request signal and generates an eighth intermediate signal at an output terminal thereof and transmits the eighth intermediate signal to the seventh NOT gate 428. The seventh NOT gate 428 generates and transmits an inverted eighth intermediate signal to a first input terminal of the sixth mux 406. The sixth mux 406 receives the fifth output signal at the second input terminal thereof. The sixth AND gate 418 receives the pending request signal and the positive edge of the synchronized slave clock signal to generate and transmit a ninth intermediate signal to the select input terminal of the sixth mux 406. The sixth mux 406 selectively provides at least one of the fifth output signal and the inverted eighth intermediate signal at an output terminal thereof as a sixth output signal. The sixth mux 406 transmits the sixth output signal to the second input terminal of the seventh mux 408. The seventh mux 408 also receives logic one as a sixth input signal at a first input terminal thereof.

The eighth NOT gate 430 receives the busy signal and generates and transmits the inverted busy signal to the ninth AND gate 432. The ninth AND gate 432 also receives the positive edge of the synchronized slave clock signal and generates and transmits a tenth intermediate signal to the select input terminal of the seventh mux 408. The seventh mux 408 selectively provides at least one of the sixth input and sixth output signals at the output terminal as a seventh output signal. The seventh mux 408 transmits the seventh output signal to the input terminal D of the third flip-flop 410. The third flip-flop 410 receives the host clock signal at a clock input terminal thereof. The third flip-flop 410 generates the slave request signal at the output terminal.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for transferring data from a host device to a slave device, wherein the host and slave devices operate on host and slave clock signals, respectively, the system comprising:
   a synchronizer circuit that receives the host and slave clock signals, synchronizes the slave clock signal with the host clock signal, and generates a synchronized slave clock signal;
   a positive edge detector, connected to the synchronizer circuit and receiving the synchronized slave clock signal, for detecting a positive edge of the synchronized slave clock signal;
   a busy signal generator, connected to the positive edge detector and the host device, for generating a busy signal when a host request is processed by the slave device; and
   a slave request generation and data latch circuit, connected to the host device, the slave device, the positive edge detector, and the busy signal generator, for receiving and storing one or more host request signals and host data, and generating and transmitting a slave request signal to the slave device when the busy signal is de-asserted and the positive edge of the synchronized slave clock signal is detected.

2. The system of claim 1, wherein the busy signal generator comprises:
   a first logic circuit for receiving slave request, pending request, and host request signals, the positive edge of the synchronized slave clock signal, and the busy signal, and generating a first intermediate signal; and
   a first flip-flop having a data input terminal connected to an output terminal of the first logic circuit for receiving the first intermediate signal, a clock input terminal that receives the host clock signal, and an output terminal that provides the busy signal to the first logic circuit.

3. The system of claim 2, wherein the first logic circuit includes:
   first and second NOT gates for respectively receiving the slave and pending request signals and generating respective inverted slave and inverted pending request signals;
   a first AND gate, connected to the first and second NOT gates, for receiving the inverted slave and inverted pending request signals, the busy signal, and the host request signal and generating a second intermediate signal;
   a second AND gate that receives the host and slave request signals, and the positive edge of the synchronized slave clock signal and generates a third intermediate signal; and
   a NOR gate, connected to output terminals of the first and second AND gates, for receiving the second and third intermediate signals and generating the first intermediate signal.

4. The system of claim 1, wherein the slave request generation and data latch circuit includes a pending request signal generator for generating a pending request signal that indicates that a host request is pending at the host device.

5. The system of claim 4, wherein the pending request signal generator comprises:
   a first logic circuit for receiving the busy signal and the host request signal, and generating a first intermediate signal;
   a first AND gate for receiving the pending request signal and the positive edge of the synchronized slave clock signal, and generating a second intermediate signal;

a second logic circuit for receiving the busy signal and the positive edge of the synchronized slave clock signal, and generating a third intermediate signal;

a first multiplexer having a first input terminal that receives a logic one as a first input signal, a second input terminal that receives the pending request signal, and a select input terminal connected to an output terminal of the first logic circuit for receiving the first intermediate signal, wherein the first multiplexer selectively provides one of the pending request and first input signals as a first mux output signal;

a second multiplexer having a first input terminal that receives a logic zero as a second input signal, a second input terminal connected to an output terminal of the first multiplexer for receiving the first mux output signal, and a select input terminal connected to an output terminal of the first AND gate for receiving the second intermediate signal, wherein the second multiplexer selectively provides one of the second input and first mux output signals as a second mux output signal;

a third multiplexer having a first input terminal that receives a logic zero as a third input signal, a second input terminal connected to an output terminal of the second multiplexer for receiving the second mux output signal, and a select input terminal connected to an output terminal of the second logic circuit for receiving the third intermediate signal, wherein the third multiplexer selectively provides one of the third input and second mux output signals as a third mux output signal; and a first flip-flop, having a data input terminal connected to an output terminal of the third multiplexer for receiving the third mux output signal, a clock input terminal that receives the host clock signal, and an output terminal that provides the pending request signal.

6. The system of claim 5, wherein the first logic circuit includes:
a first NOT gate for receiving the busy signal and generating an inverted busy signal; and
a second AND gate, connected to the first NOT gate, for receiving the inverted busy signal and the host request signal, and generating the first intermediate signal.

7. The system of claim 6, wherein the second logic circuit includes:
a second NOT gate for receiving the busy signal and generating a second inverted busy signal; and
a third AND gate, connected to the second NOT gate, for receiving the second inverted busy signal and the positive edge of the synchronized slave clock signal, and generating the third intermediate signal.

8. The system of claim 4, wherein the slave request generation and data latch circuit includes a slave request signal generator for generating the slave request signal.

9. The system of claim 8, wherein the slave request signal generator comprises:
a first logic circuit for receiving the host request signal, the pending request signal, and the positive edge of the synchronized clock signal, and generating a first intermediate signal;
a second logic circuit for receiving the slave and host request signals, and generating an inverted second intermediate signal;
a first AND gate for receiving the pending request signal and the positive edge of the synchronized slave clock signal, and generating a third intermediate signal;
a third logic circuit for receiving the busy signal and the positive edge of the synchronized slave clock signal, and generating a fourth intermediate signal;

a first multiplexer having a first input terminal that receives a logic zero as a first input signal, a second input terminal that receives the slave request signal, and a select input terminal that receives the positive edge of the synchronized slave clock signal, wherein the first multiplexer selectively provides one of the slave request signal and the first input signal as a first mux output signal;

a second multiplexer having a first input terminal that receives a logic one as a second input signal, a second input terminal connected to an output terminal of the first multiplexer for receiving the first mux output signal, and a select input terminal connected to an output terminal of the first logic circuit for receiving the first intermediate signal, wherein the second multiplexer selectively provides one of the second input signal and the first mux output signal as a second mux output signal;

a third multiplexer having a first input terminal connected to an output terminal of the second logic circuit for receiving the inverted second intermediate signal, a second input terminal connected to an output terminal of the second multiplexer for receiving the second mux output signal, and a select input terminal connected to an output terminal of the first AND gate for receiving the third intermediate signal, wherein the third multiplexer selectively provides one of the inverted second intermediate signal and the second mux output signal as a third mux output signal;

a fourth multiplexer having a first input terminal that receives a logic one as a third input signal, a second input terminal connected to an output terminal of the third multiplexer for receiving the third mux output signal, and a select input terminal connected to an output terminal of the third logic circuit for receiving the fourth intermediate signal, wherein the fourth multiplexer selectively provides one of the third input signal and the third mux output signal as a fourth output signal; and a first flip-flop, having a data input terminal connected to an output terminal of the fourth multiplexer for receiving the fourth mux output signal, a clock input terminal that receives the host clock signal, and an output terminal that provides the slave request signal.

10. The system of claim 9, wherein the first logic circuit includes:
a first NOT gate for receiving the pending request signal and generating an inverted pending request signal; and
a second AND gate, connected to the first NOT gate for receiving the inverted pending request signal at a first input terminal, receiving the host request signal at a second input terminal, and receiving the positive edge of the synchronized clock signal at a third input terminal, and generating the first intermediate signal at an output terminal thereof.

11. The system of claim 10, wherein the second logic circuit includes:
a second NOT gate for receiving the host request signal and generating an inverted host request signal;
a third AND gate, connected to the second NOT gate for receiving the slave request at a first input terminal, and receiving the inverted host request signal at a second input terminal, and generating a second intermediate signal at an output terminal thereof; and
a third NOT gate, connected to the third AND gate, for receiving the second intermediate signal and generating the inverted second intermediate signal.

12. The system of claim 11, wherein the third logic circuit includes:

a third NOT gate for receiving the busy signal and generating an inverted busy signal; and a fourth AND gate having a first input terminal connected to the third NOT gate for receiving the positive edge of the synchronized slave clock signal and a second input terminal that receives the inverted busy signal, and an output terminal for providing the fourth intermediate signal.

13. The system of claim 8, wherein the slave request generation and data latch circuit further includes a host data latch for storing the host data and transmitting the host data to the slave device based on the host request and busy signals.

14. The system of claim 1, wherein the host device includes a processor and the slave device includes a data register.

15. The system of claim 1, wherein a frequency of the host clock signal is greater than a frequency of the slave clock signal.

16. A system for transferring data from a host device to a slave device, wherein the host and slave devices operate on host and slave clock signals, respectively, comprising:

a synchronizer circuit for synchronizing the slave clock signal with the host clock signal and generating a synchronized slave clock signal;

a positive edge detector, connected to the synchronizer circuit, for detecting a positive edge of the synchronized slave clock signal;

a busy signal generator, connected to the positive edge detector and the host device, for generating a busy signal when a host request is processed by the slave device, wherein the busy signal generator comprises:

first and second NOT gates for receiving slave and pending request signals and generating inverted slave and inverted pending request signals, respectively;

a first AND gate, connected to the first and second NOT gates, for receiving the inverted slave and inverted pending request signals, the busy signal, and a host request signal and generating a first intermediate signal at an output terminal thereof;

a second AND gate for receiving the host and slave request signals, and the positive edge of the synchronized slave clock signal and generating a second intermediate signal at an output terminal thereof;

a NOR gate, connected to the output terminals of the first and second AND gates, for receiving the first and second intermediate signals and generating a third intermediate signal at an output terminal thereof; and a first flip-flop, having a data input terminal connected to the output terminal of the NOR gate for receiving the third intermediate signal, a clock input terminal that receives the host clock signal, and an output terminal that generates the busy signal, wherein the output terminal of the flip-flop is connected to an input terminal of the first AND gate; and a slave request generation and data latch circuit, connected to the host device, the slave device, the positive edge detector, and the busy signal generator, for receiving and storing one or more host requests and host data, and generating and transmitting a slave request signal to the slave device when the busy signal is de-asserted and the positive edge of synchronized slave clock signal is detected, wherein the slave request generation and data latch circuit includes a pending request signal generator for generating the pending request signal, and wherein the pending request signal generator comprises:

a third NOT gate for receiving the busy signal and generating an inverted busy signal;

a third AND gate, connected to the third NOT gate, for receiving the inverted busy signal and the host request signal, and generating a fourth intermediate signal at an output terminal thereof;

a fourth AND gate for receiving the pending request signal and the positive edge of the synchronized slave clock signal, and generating a fifth intermediate signal at an output terminal thereof;

a fourth NOT gate for receiving the busy signal and generating the inverted busy signal;

a fifth AND gate for receiving the positive edge of the synchronized slave clock signal and the inverted busy signal, and generating a sixth intermediate signal at an output terminal thereof;

a first multiplexer having a first input terminal that receives a logic one as a first input signal, a second input terminal that receives the pending request signal, and a select input terminal connected to the output terminal of the third AND gate for receiving the fourth intermediate signal, wherein the first multiplexer selectively provides at least one of the pending request and first input signals as a first output signal at an output terminal thereof;

a second multiplexer having a first input terminal that receives a logic zero as a second input signal, a second input terminal that is connected to the output terminal of the first multiplexer for receiving the first output signal, and a select input terminal connected to the output terminal of the fourth AND gate for receiving the fifth intermediate signal, wherein the second multiplexer selectively provides at least one of the second input and first output signals as a second output signal at an output terminal thereof;

a third multiplexer having a first input terminal that receives a logic zero as a third input signal, a second input terminal that is connected to the output terminal of the second multiplexer for receiving the second output signal, and a select input terminal connected to the output terminal of the fifth AND gate for receiving the sixth intermediate signal, wherein the third multiplexer selectively provides at least one of the third input and second output signals as a third output signal at an output terminal thereof; and a second flip-flop, having a data input terminal connected to the output terminal of the third multiplexer for receiving the third output signal, a clock input terminal that receives the host clock signal, and an output terminal that generates the pending request signal, wherein the output terminal of the second flip-flop is connected to the second input terminal of the first multiplexer.

17. The system of claim 16, wherein the slave request generation and data latch circuit further includes a slave request signal generator for generating the slave request signal.

18. The system of claim 17, wherein the slave request signal generator comprises:

a fifth NOT gate for receiving the pending request signal and generating an inverted pending request signal;

a sixth AND gate, connected to the fifth NOT gate, for receiving the inverted pending request signal, the host request signal, and the positive edge of the synchronized slave clock signal, and generating a seventh intermediate signal at an output terminal thereof;

a sixth NOT gate for receiving the host request signal and generating an inverted host request signal;

a seventh AND gate, connected to the sixth NOT gate, for receiving the slave request and inverted host request signals, and generating an eighth intermediate signal at an output terminal thereof;

a seventh NOT gate, connected to the seventh AND gate, for receiving the eighth intermediate signal and generating an inverted eighth intermediate signal;

an eighth AND gate for receiving the pending request signal and the positive edge of the synchronized slave clock signal, and generating a ninth intermediate signal at an output terminal thereof;

an eighth NOT gate for receiving the busy signal and generating the inverted busy signal;

a ninth AND gate, connected to the eighth NOT gate, for receiving the positive edge of the synchronized slave clock signal and the inverted busy signal, and generating a tenth intermediate signal at an output terminal thereof;

a fourth multiplexer having a first input terminal that receives a logic zero as a fourth input signal, a second input terminal that receives the slave request signal, and a select input terminal that receives the positive edge of the synchronized slave clock signal, wherein the fourth multiplexer selectively provides at least one of the slave request and fourth input signals as a fourth output signal at an output terminal thereof;

a fifth multiplexer having a first input terminal that receives a logic one as a fifth input signal, a second input terminal connected to the output terminal of the fourth multiplexer for receiving the fourth output signal, and a select input terminal connected to the output terminal of the sixth AND gate for receiving the seventh intermediate signal, wherein the fifth multiplexer selectively provides at least one of the fifth input and fourth output signals as a fifth output signal at an output terminal thereof;

a sixth multiplexer having a first input terminal connected to the seventh NOT gate for receiving the inverted eighth intermediate signal, a second input terminal connected to the output terminal of the fifth multiplexer for receiving the fifth output signal, and a select input terminal connected to the output terminal of the eighth AND gate for receiving the ninth intermediate signal, wherein the sixth multiplexer selectively provides at least one of the inverted eighth intermediate and fifth output signals as a sixth output signal at an output terminal thereof;

a seventh multiplexer having a first input terminal that receives a logic one as a sixth input signal, a second input terminal connected to the output terminal of the sixth multiplexer for receiving the sixth output signal, and a select input terminal connected to the output terminal of the ninth AND gate for receiving the tenth intermediate signal, wherein the seventh multiplexer selectively provides at least one of the sixth input and sixth output signals as a seventh output signal at an output terminal thereof; and a third flip-flop, having a data input terminal connected to the output terminal of the seventh multiplexer for receiving the seventh output signal, a clock input terminal that receives the host clock signal, and an output terminal that generates the slave request signal, wherein the output terminal of the third flip-flop circuit is connected to the second input terminal of the fourth multiplexer.

19. The system of claim 16, wherein the slave request generation and data latch circuit further includes a host data latch for storing the host data and transmitting the host data to the slave device based on the host request signal and the busy signal.

20. The system of claim 16, wherein the host device includes a processor and the slave device includes a data register.

\* \* \* \* \*